(12) United States Patent
Akatsu et al.

(10) Patent No.: US 6,977,496 B2
(45) Date of Patent: Dec. 20, 2005

(54) COAXIAL MULTIPLEX POSITION DETECTOR AND ROTATING MACHINE USING COAXIAL MULTIPLEX POSITION DETECTOR

(75) Inventors: Kan Akatsu, Tokyo (JP); Masaki Nakano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 40 days.

(21) Appl. No.: 10/728,899

(22) Filed: Dec. 8, 2003

(65) Prior Publication Data

US 2004/0119466 A1 Jun. 24, 2004

(30) Foreign Application Priority Data

Dec. 18, 2002 (JP) ............................. 2002-366663

(51) Int. Cl.[7] .......................... G01B 7/14; G01B 7/30; H01F 5/00
(52) U.S. Cl. .......................... 324/207.15; 324/207.25; 318/661
(58) Field of Search .................. 324/207.15, 207.18, 324/207.11, 207.13, 207.25, 207.23; 310/114, 310/115, 166, 168, 254; 318/602, 605, 463, 318/661

(56) References Cited

U.S. PATENT DOCUMENTS

| | | | |
|---|---|---|---|
| 5,300,884 A | | 4/1994 | Maestre |
| 5,339,030 A | * | 8/1994 | Hayashi .................. 324/207.23 |
| 5,508,608 A | * | 4/1996 | Goossens .................... 324/174 |
| 5,949,211 A | | 9/1999 | McCann |
| 6,049,152 A | | 4/2000 | Nakano |
| 6,541,959 B2 | * | 4/2003 | Gudgeon et al. ...... 324/207.15 |

| | | | |
|---|---|---|---|
| 2003/0155884 A1 | | 8/2003 | Witzig |

FOREIGN PATENT DOCUMENTS

| | | | | |
|---|---|---|---|---|
| FR | 002599137 A1 | * | 11/1987 | .......... G01D 5/247 |
| JP | 62-185120 | * | 12/1986 | .......... G01D 5/245 |
| JP | 07-264822 A | | 10/1995 | |
| JP | 9-331695 A | | 12/1997 | |
| JP | 2000-14103 A | | 1/2000 | |
| JP | 02001012969 A | * | 1/2001 | .......... G01D 5/245 |
| JP | 2002-136169 A | | 5/2002 | |
| WO | WO 02/091557 A1 | | 11/2002 | |

OTHER PUBLICATIONS

U.S. Appl. No. 10/830,105, filed Apr. 23, 2004, Arimitsu et al.
U.S. Appl. No. 10/895,420, filed Jul. 21, 2004, Arimitsu et al.
U.S. Appl. No. 10/400,509, filed Mar. 28, 2003, Akatsu.

* cited by examiner

*Primary Examiner*—Edward Lefkowitz
*Assistant Examiner*—Kenneth J. Whittington
(74) *Attorney, Agent, or Firm*—Foley & Lardner LLP

(57) ABSTRACT

In a coaxial multiplex position detecting apparatus for a rotating machine, a stator includes stator pieces, each stator piece individually being split in a circumferential direction of the stator, an exciting current winding, and a detection winding, the exciting current winding and the detection winding being wound on the respective stator pieces, and a plurality of rotors are disposed on outside and inside positions of the stator in a radial direction of the stator, the respective rotors having convex and recess portions in accordance with the number of poles that the respective rotors have and having different numbers of poles according to the inside and outside positions of the rotors from each other, revolution positions of the respective rotors being determined according to an output signal of the detection winding of the stator.

10 Claims, 5 Drawing Sheets

WAVEFORM OF VOLTAGE V OF DETECTION WINDING 7-1-1

$V_{10} = A\cos\theta$     $V_{11} = A\cos2\theta'$ $V_1 = A\cos\theta + A\cos2\theta'$

WAVEFORM OF VOLTAGE V OF DETECTION WINDING 7-1-3

$V_{30} = A\cos(\theta-180)$     $V_{31} = A\cos2(\theta'-180)$ $V_3 = A\cos(\theta-180) + A\cos2(\theta'-180)$

COAXIAL MULTIPLEX POSITION DETECTOR AND ROTATING MACHINE USING COAXIAL MULTIPLEX POSITION DETECTOR

BACKGROUND OF THE INVENTION

1. Field of the Invention

The present invention relates to a multiplex position detector which is capable of detecting rotor positions of revolving members such as in a coaxial rotating machine and a rotating machine in which the multiplex position detector is mounted.

2. Description of the Related Art

In recent years, such a coaxial rotating machine as described above having a stator between an outer rotor and an inner rotor has been used. In such a kind of rotating machines as described above, both inner rotor and outer rotor as described above are independently revolved around the fixed stator. Hence, it is necessary to recognize positions of the respective outer rotor and inner rotor independently and separately. To cope with this necessity, a Japanese Patent Application First Publication No. 2000-14103 published on Jan. 14, 2000 exemplifies such separate detectors as outer rotor position detector for the outer rotor and inner rotor detector for the inner rotor which are respectively installed in the rotating machine.

SUMMARY OF THE INVENTION

As described above, in a previously proposed rotating machine disclosed in the above-described Japanese Patent Application First Publication, mutually independent position detectors have been used. Hence, a usage of the mutually independent position detectors causes increases in an axial length and in a wiring distribution of the rotating machine. These provide major problems in rotating machines in which a compact structure is a most important problem. It has been desired (or demanded) that a rotor position detector which can eliminate this problem is to be developed.

It is, therefore, an object of the present invention to provide a coaxial multiplex position detector which is capable of eliminating the increase in the axial length of the rotating machine and the increase in the electrical wirings when this detector is mounted in the rotating machine.

According to a first aspect of the present invention, there is provided a coaxial multiplex position detecting apparatus for a rotating machine, comprising: a stator including stator pieces, each stator piece individually being split in a circumferential direction of the stator, an exciting current winding, and a detection winding, the exciting current winding and the detection winding being wound on the respective stator pieces; and a plurality of rotors disposed on outside and inside positions of the stator in a radial direction of the stator, the respective rotors having convex and recess portions in accordance with the number of poles that the respective rotors have and having different numbers of poles according to the inside and outside positions of the rotors from each other, revolution positions of the respective rotors being determined according to an output signal of the detection winding of the stator.

According to a second aspect of the present invention, there is provided a method applicable to a coaxial multiplex detecting apparatus for a rotating machine, comprising: providing a stator including stator pieces, each stator piece individually being split in a circumferential direction of the stator, an exciting current winding, and a detection winding, the exciting current winding and the detection winding being wound on the respective stator pieces; providing a plurality of rotors disposed on outside and inside positions of the stator in a radial direction of the stator, the respective rotors having convex and recess portions in accordance with the number of poles that the respective rotors have and having different numbers of poles according to the inside and outside positions of the rotors from each other; and determining revolution positions of the respective rotors according to an output signal of the detection winding of the stator.

According to a third aspect of the present invention, there is provided a rotating machine in a coaxial structure comprising: a coaxial multiplex position detector comprising; a stator including stator pieces, each stator piece individually being split in a circumferential direction of the stator, an exciting current winding, and a detection winding, the exciting current winding and the detection winding being wound on the respective stator pieces; and two rotors disposed on outside and inside positions in a radial direction of the stator, the respective rotors having convex and recess portions in accordance with the number of poles that the respective rotors have and having different numbers of poles according to the inside and outside positions of the rotors from each other, the rotor positions being determined according to outputs of the detection winding of the stator, one of the outer and inner rotors of the coaxial multiplex position detector, one of the inner rotor and the outer rotor of the coaxial multiplex position detector being attached onto an outer rotor of the rotating machine, the other rotor being attached onto an inner rotor of the rotating machine, and the stator of the coaxial multiplex position detector being fixed onto a stator of the rotating machine.

This summary of the invention does not necessarily describe all necessary features so that the invention may also be a sub-combination of these described features.

DETAILED DESCRIPTION OF THE PREFERRED EMBODIMENT

Figure 1B:
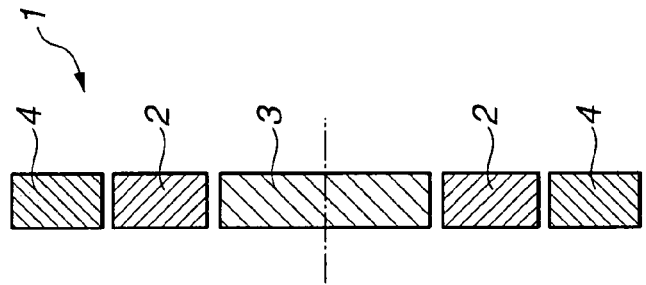
FIG. 1A is a schematic overall view of a rotating machine in which a coaxial multiplex position detector according to the present invention is applicable and FIG. 1B is a cross sectional view of the coaxial multiplex position detector cut away along a line I—I shown in FIG. 1A.

Reference will hereinafter be made to the drawings in order to facilitate a better understanding of the present invention.

Before explaining a preferred embodiment of the coaxial multiplex position detector according to the present invention, action and advantages of the present invention will be described below.

In the multiplex position detector according to the present invention, two rotor position detectors are reduced and changed to one position detector since the one position detector can detect two positions of rotors as will be described later. Hence, in a case where the detector is installed in the rotating machine, an axial length of the whole rotating machine can be shortened. Furthermore, the wiring around the two position detectors are reduced to one group only so that a probability of a dangerous accident such as a wiring breakage is reduced. In the multiple position detector according to the present invention, the inner and outer rotor are constituted by, for example, laminated steel plates having, convex portion and recess portion. A sinusoidal wave is outputted in accordance with the convex portion and the recess portion of each rotor. This is because, as viewed from a stator, a magnetic resistance is low at the convex portion and the magnetic resistance is high at the recess portion. Utilizing this sinusoidal wave, a relationship of the sinusoidal wave to an exciting current is used so as to enable the detection of the rotors' positions. It is noted that the numbers of poles of the inner and outer rotors of the rotating machine are changed so that a signal which is a composite of inner and outer rotor position signals is outputted to a detection winding. In other words, two kinds of signals are superposed on the single stator and, thus, two kinds of position signals are outputted from the single stator. Since the number of poles of the respective rotors are different, the signal outputted from the stator has different phases and frequencies for the respective rotors, as viewed from the stator. Thus, a signal separation is made possible without a mutual interference.

In the coaxial multiplex position detector according to the present invention, it is preferable to constitute the detection winding by four windings wound on stator pieces of the stator so that the respective windings of the detection winding has the phase 90° different from one other. Furthermore, the signal from the detection winding detects the position of one of the rotors having the number of poles which are greater than those of the other with the signal of the detection winding whose phase is different by 180° added, the position of the other of the two rotors whose number of poles is less than the one of the two rotors is preferably detected.

Suppose that the windings constituting the detection winding are mutually deviated by 90° and a ratio of number of poles for the respective rotors is 1:2. Then, a voltage signal outputted to each of the above-described four windings is as follows:

a first winding: $V1=A*(\cos\theta+\cos 2\theta')$, a second winding: $V2=A*(\cos(\theta-90)+\cos 2(\theta'-90))$, a third winding: $V3=A*(\cos(\theta-180)+\cos 2(\theta'-180))$, and a fourth winding: $V4=A*(\cos(\theta-270)+\cos 2(\theta'-270))$, wherein $\theta$ denotes an (angular) position of the one of the rotors whose number of poles is greater than that of the other of the rotors and A denotes an exciting (current) signal and, ordinarily, sinusoidal wave signal $A=E\sin(\omega t)$ is added. Since the first winding output and third winding output are added so that a term on $\theta$ is eliminated. Namely, $$V1+V3=A*2\cos 2'.$$

Thus, only the component of $\theta'$ can be detected. In addition, if the second winding output is added to the fourth winding output. That is to say, $$V2+V4=A*2\cos(\theta'-90).$$

Figure 2:
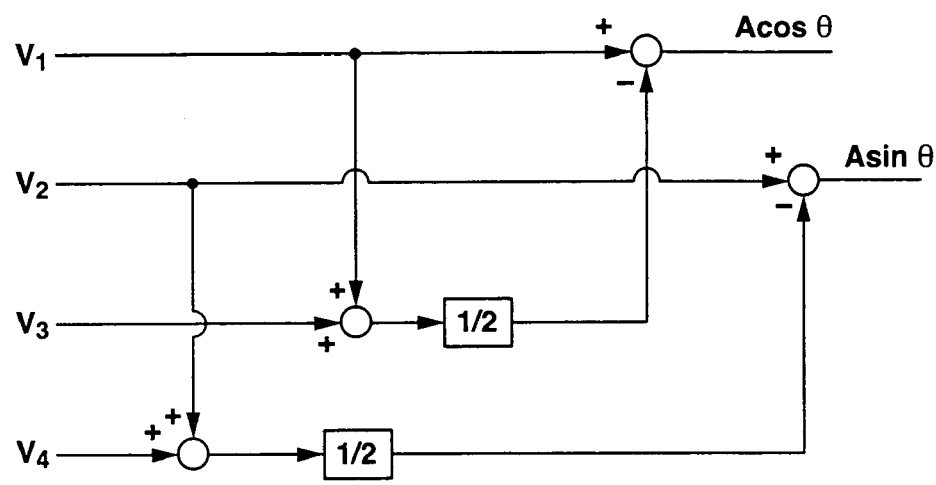
FIG. 2 is an example of a circuit carrying out a prior process before a position detection in a coaxial multiplex detector according to the present invention.
Figure 3:
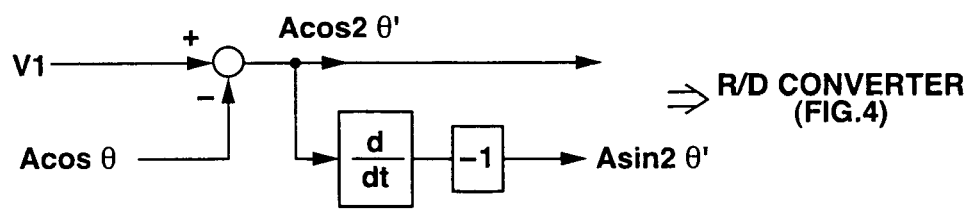
FIG. 3 is another example of the circuit carrying out the prior process before the position detection in the coaxial multiplex detector according to the present invention.
Figure 4:
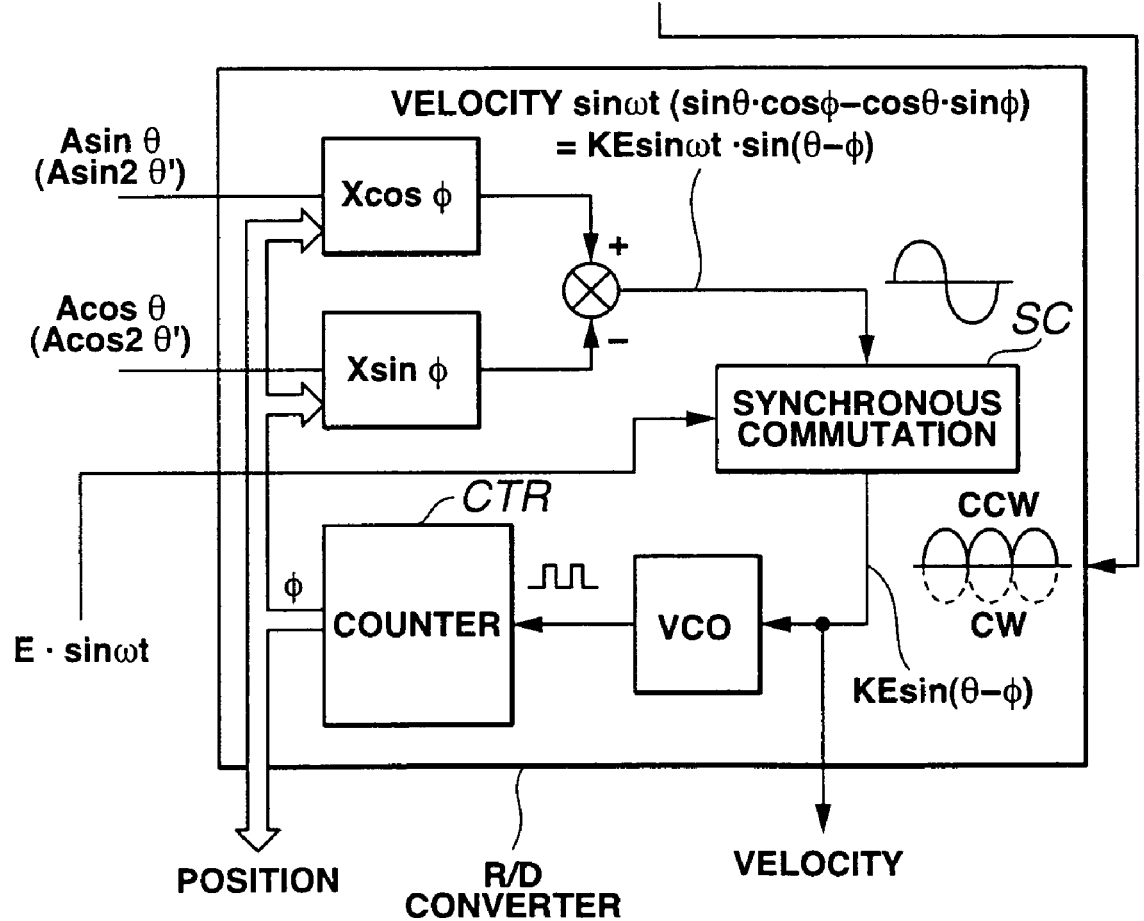
FIG. 4 is an example of a tracking type R (resolver) to D (digital) converter used in a position detection in the coaxial multiplex position detector according to the present invention.
Figure 5A:
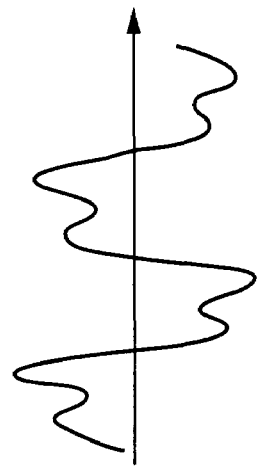
FIGS. 5A, 5B, 5C, and 5D are voltage waveforms developed on detection windings in the coaxial multiplex position detector according to the present invention.
Figure 5B:
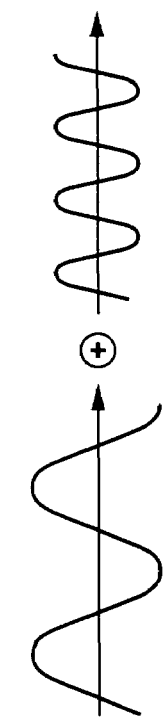
Figure 5C:
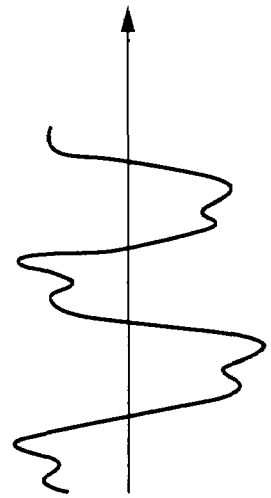
Figure 5D:
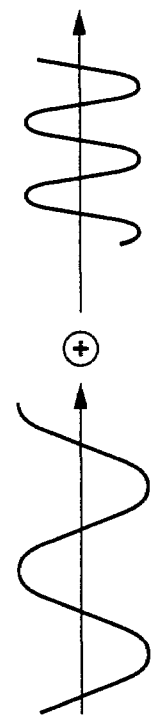

In order to detect signal of $\theta$ from the detected signal of $\theta'$, $V1-(V1+V3)/2$ is calculated as shown in FIG. 2 using one adder, one subtractor, and a ½ multiplier. Consequently, a term of $\cos\theta$ can be detected (namely, $A\cos\theta$). In the same way, the term of $\sin\theta$ is detected according to the calculation of $V2-(V2+V4)/2$ (namely, $A\sin\theta$) as shown in FIG. 2 using one adder and a ½ multiplier. The derived $A\cos\theta$ and $A\sin\theta$ are supplied to R(resolver)/D (digital) converter shown in FIG. 4 to derive position ($\phi$) of one of the two rotors related to $\theta$. That is to say, as shown in FIG. 4, the R/D converter includes: $\sin\phi$ multiplier; $\cos\phi$ multiplier; an adder with a KE multiplier to output $KE\sin\omega t\cdot\sin(\theta-\phi)$; a synchronous commutation (synchronous commutator SC); a VCO (Voltage Controlled Oscillator); and a counter CTR to count the number of pulses from VCO. It is noted that the velocity of the rotor related to $\theta$ is determined as $KE\sin(\theta-\phi)$ (=KE if $\theta-\phi=0$). Next, $A\cos\theta$ derived as described above is subtracted from V1 to obtain $A\cos 2\theta'$ as shown in FIG. 3. Then, $A\sin 2\theta'$ is obtained from a differentiation of $A\cos 2\theta'$ and a minus sign is added to obtain $A\sin 2\theta'$, as shown in FIG. 3. In the same way as obtaining of $\theta$, $A\sin 2\theta'$ and $A\cos 2\theta'$ are inputted to R/D converter as shown in FIG. 4. Then, the position of $2\theta'$ is obtained and, using ½ multiplier, the position of $\theta'$ is obtained.

As described above, four windings of detection winding, each winding being deviated mutually by 90° are used to obtain the positions of the two rotors. The rotating machine according to the present invention includes two inner and outer rotors, the stator between the inner rotor and the outer rotor is provided to constitute the coaxial structure rotating machine. One of the outer (peripheral) rotor and inner (peripheral) rotor is disposed on outer rotor of the rotating machine of the coaxial multiplex position detector, the other rotor being disposed on the inner rotor of rotating machine, the stator of the coaxial multiplex position detector being fixed to the stator of rotating machine.

Since the coaxial multiplex position detector is used in the rotating machine of the coaxial structure, a single position detector whose axial length corresponds to the single position detector permits the detection of the positions of the inner rotor and outer rotor in the rotating machine. In addition, in a case where the outer (peripheral) rotor in the inner rotor detector is fixed, the laminated steel plate of the outer peripheral rotor of the detector can previously be disposed on the inner rotor.

Figure 1A:
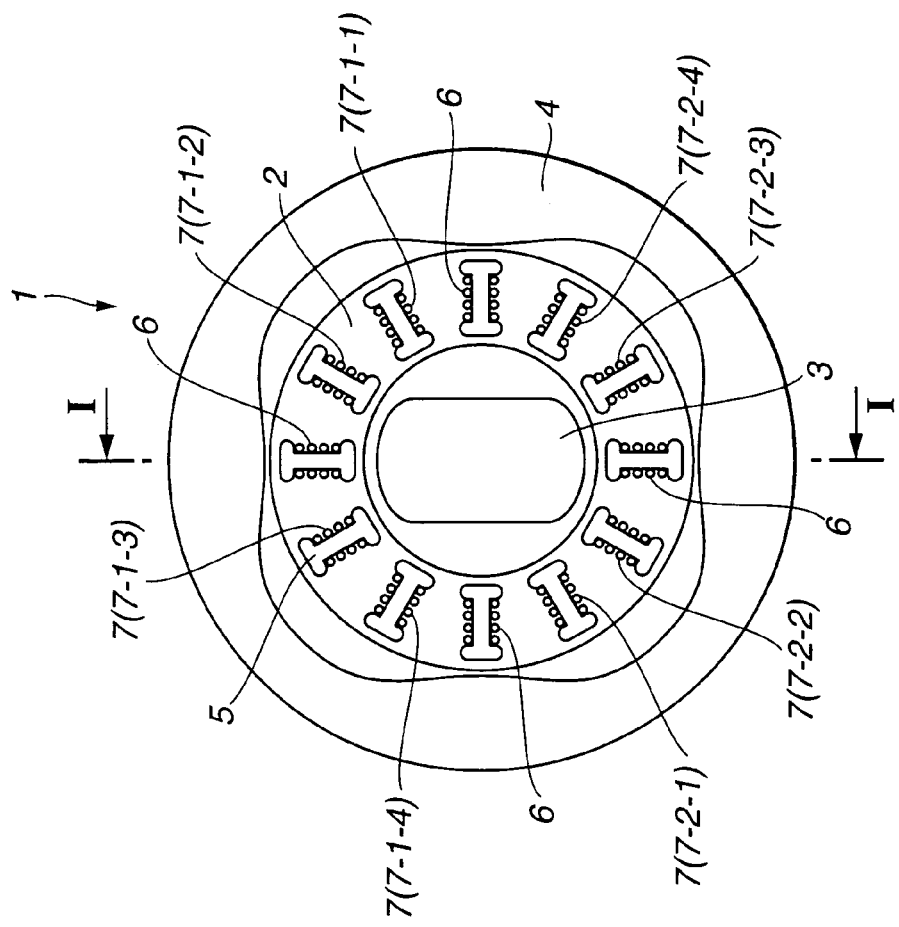

Next, FIGS. 1A and 1B show an example of a structure of the coaxial multiplex position detector in the preferred embodiment according to the present invention mounted in the rotating machine.

FIG. 1A shows a front view of the coaxial multiplex position detector in the preferred embodiment and FIG. 1B shows a side cross sectional view of the coaxial multiplex position detector cut away along a line of I—I shown in FIG. 1A.

In FIGS. 1A and 1B, coaxial multiplex position detector 1 includes stator 2, inner rotor 3 arranged on an inner side of stator 2, and outer rotor 4 arranged on an outer side of stator 2.

The rotating machine to which coaxial multiplex position detector in the preferred embodiment is applicable includes:

stator 2; inner rotor 3 arranged on an inside of stator 2; and outer rotor 4 arranged on an outside of stator 2. The number of poles of inner rotor 3 and outer rotor 4 are different from each other. For example, in FIGS. 1A, 1B, and 2, inner rotor 3 has two pole pairs and outer rotor 4 has four pole pairs. In addition, each rotor has convex and recess portions correspond to the number of poles. That is to say, inner rotor 3 has two couples of convex and recess portions in inner rotor 3 (two numbers of pole pairs) and outer rotor 4 has different number of poles (in order words, different number of pole pairs) corresponding to four number of pole pairs.

Stator 2 is constituted by individually split stator pieces 5. In this case, the number of stator pieces are twelve. On each stator piece 5, exciting winding 6 and detection winding 7 are wound as shown in FIGS. 1A, 1B, and 2. In this example, since the positions of inner rotor 3 and outer rotor 4 are needed to be determined separately. Hence, two couples of detection winding 7, namely, detection winding is constituted by first couple of Number 1 through Number 4 (7-1-1 through 7-1-4) and detection winding (7-2-1 through 7-2-4). Each detection winding 7-1-1 through 7-1-4 of each rotor (or 7-2-1 through 7-2-4) is wound on stator piece 5 so as to make the phase different for each 90 degree.

In this state, the signal from detection winding 7 is added to the signal from detection windings each of which has a phase difference of 180 degrees in the position detecting apparatus. The less number of pole pairs can be detected using the position signal of rotor (an outer rotor 4) the position of the other rotor whose number of pole pairs is less (inner rotor 4).

Next, in coaxial multiplex position detector 1, a method of determining positions of actual inner rotor 3 and outer rotor 4 will be described below. It is noted that the position measurement at detection windings of first through fourth detecting windings 7-1-1 through 7-1-4 of the first couple and the position measurement at detection windings at first through fourth detection windings 7-2-1 through 7-2-4 of the second couple are mutually the same measurement methods.

Hence, the first couple of detection windings at first through fourth detection windings 7-2-1 through 7-2-4 of the second couple are mutually the same measurement methods.

Figure 6:
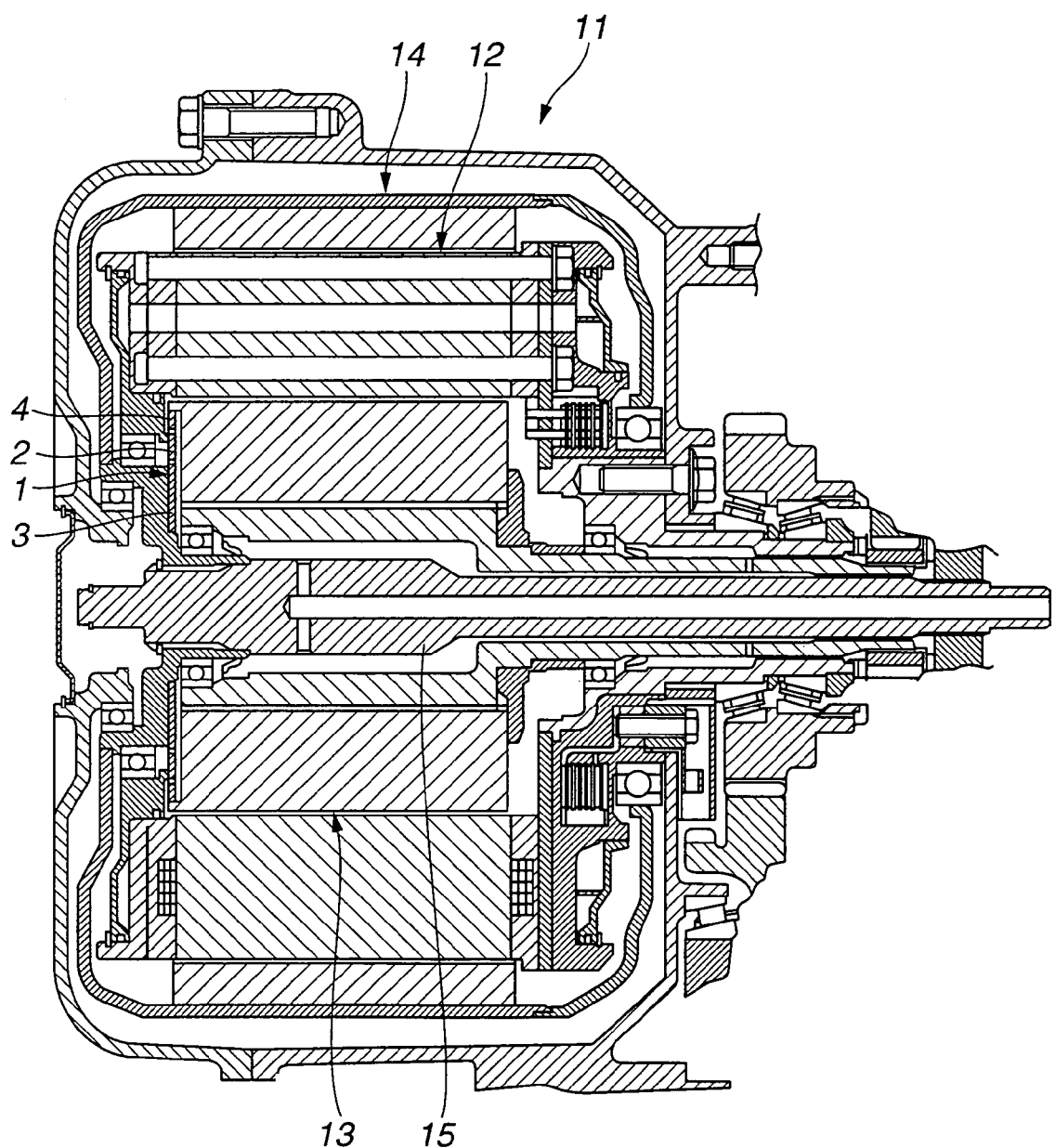
FIG. 6 is an example of a coaxial rotating machine in which the coaxial multiplex position detector according to the present invention is applicable.

FIG. 6 is an example of the coaxial multiplex position detector which is incorporated into the coaxial rotating machine. In the example of FIG. 6, coaxial rotating machine 11 includes: a stator 12, an inner rotor 13 disposed along an inner periphery of stator 12, and an outer rotor 14 disposed on an outer periphery of stator 12. In order to detect the positions of inner rotor 13 and outer rotor 14 of rotating machine 11, coaxial multiplex position detector 1 is utilized so that outer rotor 4 of coaxial multiplex position detector 1 is connected to inner rotor 13 of rotating machine 11 and inner rotor 3 of coaxial multiplex position detector 1 is connected to outer rotor 14 of rotating machine 11. It is noted that, in this embodiment, an outer rotor shaft 15 is penetrated through an inside of inner rotor 13 of rotating machine is constructed as described above, the rotor connection and arrangement are not limited to this.

FIGS. 5A through 5D show waveforms of voltage V1 of first detection winding 7-1-1 and voltage V3 of third detection winding of 7-1-3. In FIGS. 5A through 5D, V10 and V30 denote voltages generated due to inner rotor 3. Secondly, FIGS. 5A through 5D show the waveform of voltage V3 at third detection winding 7-1-3. In FIGS. 5A through 5D, V10 and V30 denote voltages developed due to inner rotor 3 and V11 and V31 denote voltages developed due to outer rotor 4.

FIG. 6 is an example of the coaxial multiplex position detector which is incorporated into the coaxial rotating machine. In the example of FIG. 6, coaxial rotating machine 11 includes: a stator 12, an inner rotor 13 disposed along an inner periphery of stator 12, and an outer rotor 143 disposed on an outer periphery of stator 12, and an outer rotor 14 disposed on an outer periphery of stator 12. In order to detect the positions of inner rotor 13 and outer rotor 14 of rotating machine 11, coaxial multiplex position detector 1 is utilized so that outer rotor 4 of coaxial multiplex position detector 1 is connected to inner rotor 13 of rotating machine 11 and inner rotor 3 of coaxial multiplex position detector 1 is connected to outer rotor 14 of rotating machine 11. It is noted that, in this embodiment, an outer rotor shaft 15 is penetrated through an inside of inner rotor 13 of rotating machine is constructed as described above, the rotor connection and arrangement are not limited to this.

It is noted that, in the embodiment, a couple of $A\cos\theta$ and $A\sin\theta$ is inputted to the resolver-and-digital converter shown in FIG. 4 and another couple of $A\cos 2\theta'$ and $A\sin 2\theta'$ is inputted to the same resolver-and-digital converter. However, the other couple of $A\cos 2\theta'$ and $A\sin 2\theta'$ may be inputted into another resolver-and-digital converter although the structure is the same. Various changes and modifications may be made without departing from the spirit and scope of the present invention which is to be defined in the appended claims.

The entire contents of a Japanese Patent Application No. 2002-366663 (filed in Japan on Dec. 18, 2002) are herein incorporated by reference. The scope of the invention is defined with reference to the following claims.

What is claimed is:

1. A coaxial multiplex position detecting apparatus for a rotating machine, comprising:
   a stator including stator pieces, each stator piece individually being split in a circumferential direction of the stator, an exciting current winding, and a detection winding, the exciting current winding and the detection winding being wound on the respective stator pieces; and
   a plurality of rotors disposed on outside and inside positions of the stator in a radial direction of the stator, the respective rotors having convex and recess portions in accordance with the number of poles that the respective rotors have and having different numbers of poles according to the inside and outside positions of the rotors from each other, revolution positions of the respective rotors being determined according to an output signal of the detection winding of the stator.

2. A coaxial multiplex position detecting apparatus for a rotating machine as claimed in claim 1, wherein the detection winding is constituted by four windings wound on the stator pieces in such a manner that a phase of each output signal of the four windings is different for each of 90 degrees.

3. A coaxial multiplex position detecting apparatus for a rotating machine as claimed in claim 1, wherein the output signal from the detection winding detects the position of one of the rotors whose number of poles are greater than those of the other rotors by adding the output signal of the detection winding whose phase is 180° different from the output signal of the detection winding to the output signal of the same detection winding and the position of the other rotor whose number of poles is less than those of the one of the rotors is detected using the position signal of the one of the rotors whose detected number of poles is greater than those of the other of the rotors.

4. A coaxial multiplex position detecting apparatus for a rotating machine as claimed in claim 2, wherein the four windings constituting the detection winding are deviated from each other by 90 degrees and a ratio of the number of poles of the respective rotors is 1:2 and the signals outputted from the four windings are as follows:

first winding of the four windings;

$V1 = A \cdot (\cos \theta + \cos 2'\theta)$ second winding of the four windings;

$V2 = A \cdot (\cos(\theta-90) + \cos 2(\theta'-90))$ third winding of the four windings;

$V3 = A \cdot (\cos(\theta-180) + \cos 2(\theta'-180))$ fourth winding of the four windings;

$V4 = A \cdot (\cos(\theta-270) + \cos 2(\theta'-270))$, wherein $\theta$ denotes a revolution position of one of the rotors whose pole number is greater than the other of the rotors, $\theta'$ denotes a revolution position of the other of the rotors whose pole number is less than the one of the rotors, and A denotes an exciting current signal and wherein $A = E \sin(\omega t)$.

5. A coaxial multiplex position detecting apparatus for a rotating machine as claimed in claim 1, wherein the position ($\theta$) of the one of the rotors whose number of poles is greater than the other of the rotors is detected on the basis of the following equations: $V1-(V1+V3)/2$ to derive $A \cos \theta$ and $V2-(V2+V4)/2$ to derive $A \sin O$ and the position ($\theta'$) of the other rotor is detected on the basis of $A \cos \theta$ and $A \sin \theta$, wherein A denotes a constant.

6. A coaxial multiplex position detecting apparatus for a rotating machine as claimed in claim 5, wherein the position ($\theta$) of the one of the rotors whose number of poles is greater than the other of the rotors is detected by inputting $A \cos \theta$ and $A \sin \theta$ into a resolver-and-digital converter.

7. A coaxial multiplex detecting apparatus for a rotating machine as claimed in claim 6, wherein the resolver-and-digital converter is used to detect the respective positions ($\theta$, $\theta'$) of the rotors.

8. A coaxial multiplex detecting apparatus for a rotating machine as claimed in claim 6, wherein $A \cos \theta$ and V1 are used to derive $A \cos 2\theta'$ and $A \sin 2\theta'$ and $A \cos 2\theta'$ and $A \sin 2\theta'$ are inputted to the resolver-and-digital converter to derive $2\theta'$.

9. A method applicable to a coaxial multiplex detecting apparatus for a rotating machine, comprising: providing a stator including stator pieces, each stator piece individually being split in a circumferential direction of the stator, an exciting current winding, and a detection winding, the exciting current winding and the detection winding being wound on the respective stator pieces; providing a plurality of rotors disposed on outside and inside positions of the stator in a radial direction of the stator, the respective rotors having convex and recess portions in accordance with the number of poles that the respective rotors have and having different numbers of poles according to the inside and outside positions of the rotors from each other; and determining revolution positions of the respective rotors according to an output signal of the detection winding of the stator.

10. A rotating machine in a coaxial structure comprising:

a coaxial multiplex position detector comprising; a stator including stator pieces, each stator piece individually being split in a circumferential direction of the stator, an exciting current winding, and a detection winding, the exciting current and the detection winding being wound on the respective stator pieces; and two rotors disposed on outside and inside positions in a radial direction of the stator, the respective rotors having convex and recess portions in accordance with the number of poles that the respective rotors have and having different numbers of poles according to the inside and outside positions of the rotors from each other, the rotor positions being determined according to outputs of the detection winding of the stator, one of the inner rotor and the outer rotor of the coaxial multiplex position detector being attached onto an outer rotor of the rotating machine, the other rotor being attached onto an inner rotor of the rotating machine, and the stator of the coaxial multiplex position detector being fixed onto a stator of the rotating machine.

* * * * *